US012718089B2

(12) United States Patent
Burch et al.

(10) Patent No.: US 12,718,089 B2
(45) Date of Patent: Aug. 25, 2026

(54) MITIGATING EFFECTS OF DAMAGE TO NEURAL NETWORKS

(71) Applicant: The Boeing Company, Chicago, IL (US)

(72) Inventors: Alexander S. Burch, Ballwin, MO (US); Richard Anthony Effler, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 1138 days.

(21) Appl. No.: 17/540,181

(22) Filed: Dec. 1, 2021

(65) Prior Publication Data

US 2022/0180191 A1 Jun. 9, 2022

Related U.S. Application Data

(60) Provisional application No. 63/121,817, filed on Dec. 4, 2020.

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

2016/0350658 A1* 12/2016 Kedia ................ H04N 21/4826
2018/0096243 A1* 4/2018 Patil ....................... G06N 3/084

FOREIGN PATENT DOCUMENTS

EP 3200139 A1 * 8/2017 .............. G06N 3/04

OTHER PUBLICATIONS

Shiqing Ma, Yingqi Liu, Wen-Chuan Lee, Xiangyu Zhang, and Ananth Grama. 2018. MODE: automated neural network model debugging via state differential analysis and input selection. (Year: 2018).*

Bowen Baker, Otkrist Gupta, Nikhil Naik and Ramesh Raskar. 2017. Designing Neural Network Architectures using Reinforcement Learning.https://arxiv.org/abs/1611.02167 (Year: 2017).*

F. Libano, B. Wilson, M. Wirthlin, P. Rech and J. Brunhaver, "Understanding the Impact of Quantization, Accuracy, and Radiation on the Reliability of Convolutional Neural Networks on FPGAs," IEEE Transactions on Nuclear Science, vol. 67, No. 7, pp. 1478-1484, Jul. 2020, doi: 10.1109/TNS.2020.2983662 (Year: 2020).*

R. Gelrhos, J. Jacobsen, C. Michaells, R. Zemel, W. Brendel, M. Bethge, and F. Wichmann, "Shortcut learning in deep neural networks", Nov. 2020, Nature Machine Learning, vol. 2, pp. 665-673 (Year: 2020).*

(Continued)

*Primary Examiner* — Kamran Afshar
*Assistant Examiner* — Gwynevere A Deterding
(74) *Attorney, Agent, or Firm* — Harrity & Harrity, LLP

(57) ABSTRACT

Aspects of the disclosure mitigate effects of damage to neural networks (NNs) onboard a platform using a primary NN trained to perform a primary task and a repair agent trained to repair the primary NN. The repair agent performs the steps of detecting a degradation of the primary NN's ability to perform the primary task and performing a repair action to repair the primary NN. The primary task is then performed by the repaired primary NN.

20 Claims, 12 Drawing Sheets

(56) References Cited

OTHER PUBLICATIONS

Tong Yu and Hong Zhu, "Hyper-Parameter Optimization: A Review of Algorithms and Applications", Mar. 2020, arXiv:2003.05689v1 (Year: 2020).*

Kiruki Cosmas and Asami Kenichi, "Utilization of FPGA for Onboard Inference of Landmark Localization in CNN-Based Spacecraft Pose Estimation", Oct. 2020, MDPI, doi: 10.3390/aerospace7110159 (Year: 2020).*

Swati Nair and Jayant Solanki, "CNN-on-CelebA-DataSet-using-Tensorflow", Jun. 2018 [WayBack Machine], https://github.com/swatishr/CNN-on-CelebA-DataSet-using-Tensorflow (Year: 2018).*

Ma, S., Liu, Y., Lee, W. C., Zhang, X., & Grama, A. (2018, October). MODE: automated neural network model debugging via state differential analysis and input selection. (Year: 2018).*

Libano, F., Wilson, B., Wirthlin, M., Rech, P., & Brunhaver, J. (2020). Understanding the impact of quantization, accuracy, and radiation on the reliability of convolutional neural networks on FPGAs. IEEE Transactions on Nuclear Science, 67(7), 1478-1484 (Year: 2020).*

Tian, Y., Pei, K., Jana, S., & Ray, B. (May 2018). Deeptest: Automated testing of deep-neural-network-driven autonomous cars. In Proceedings of the 40th international conference on software engineering (pp. 303-314). (Year: 2018).*

Gupta, R., Pal, S., Kanade, A., & Shevade, S. (Feb. 2017). Deepfix: Fixing common c language errors by deep learning. In Proceedings of the aaai conference on artificial intelligence (vol. 31, No. 1). (Year: 2017).*

* cited by examiner

100
PRIMARY TASK TRAINING CASES 122
PRIMARY NN TRAINER 120
PRIMARY NN 200
REPAIR TRAINING CASES 522
REPAIR AGENT TRAINING 500
REPAIR AGENT 110
DAMAGE MODEL 152
DEPLOYMENT
OPERATING ENVIRONMENT 130
COMPUTING DEVICE 900
MEMORY 902
PRIMARY NN 200
REPAIR AGT. 110
DATA 136
1100
134
140
142
132
OUTPUT 144
146

600
APPARATUS (PLATFORM) 1100
COMPUTING DEVICE 900
RESULTS 604
REPAIR TEST CASES 622
SCORING 606
REWARD SIGNAL 610a
PRIMARY NN 200
REPAIR ACTION 620a
REPAIR AGENT 110
REPAIR ACTIONS 620
REWARD SIGNAL 610b
SENSOR DATA FUSION 630
134
632
634
132

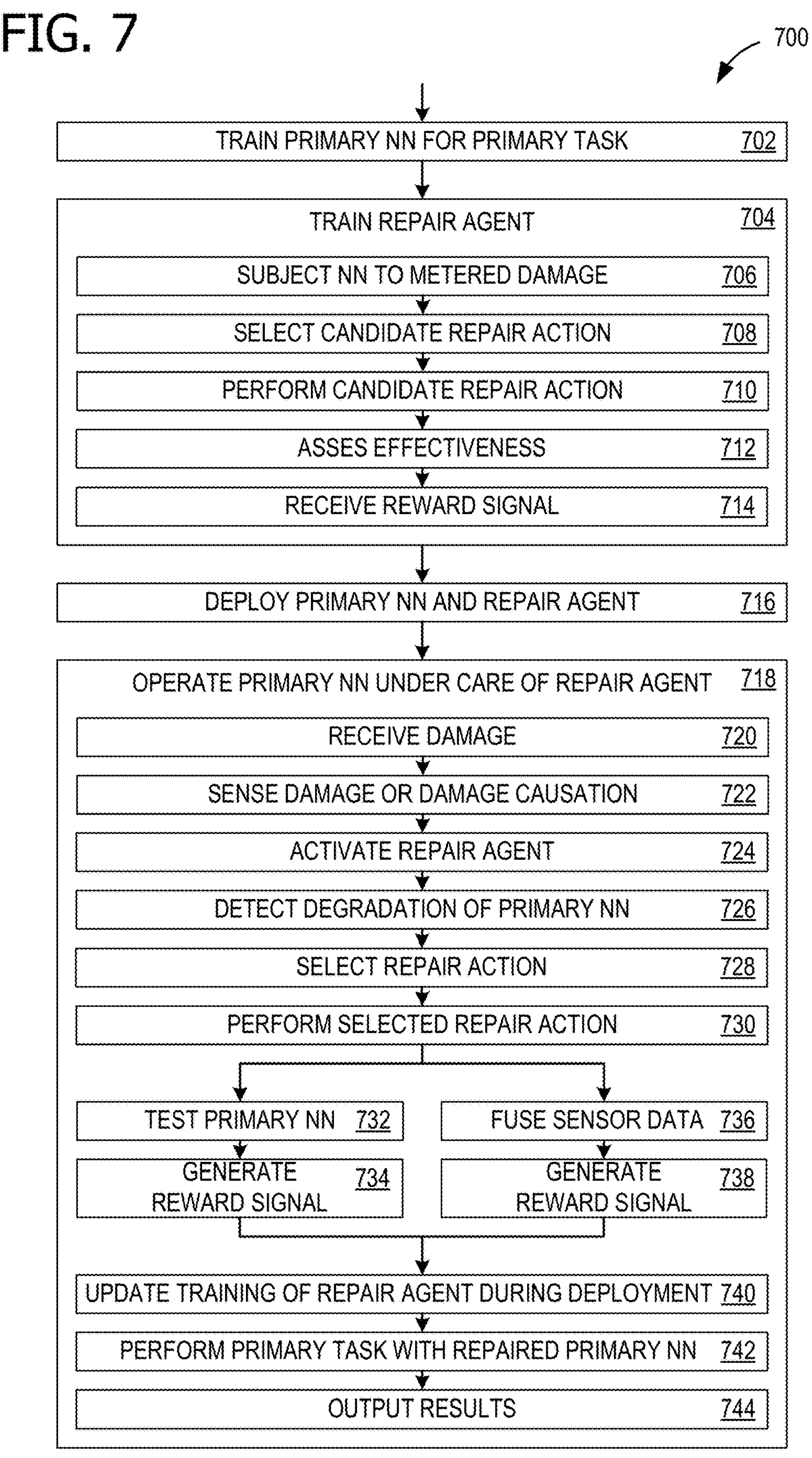
FIG. 7
700
TRAIN PRIMARY NN FOR PRIMARY TASK 702
TRAIN REPAIR AGENT 704
SUBJECT NN TO METERED DAMAGE 706
SELECT CANDIDATE REPAIR ACTION 708
PERFORM CANDIDATE REPAIR ACTION 710
ASSES EFFECTIVENESS 712
RECEIVE REWARD SIGNAL 714
DEPLOY PRIMARY NN AND REPAIR AGENT 716
OPERATE PRIMARY NN UNDER CARE OF REPAIR AGENT 718
RECEIVE DAMAGE 720
SENSE DAMAGE OR DAMAGE CAUSATION 722
ACTIVATE REPAIR AGENT 724
DETECT DEGRADATION OF PRIMARY NN 726
SELECT REPAIR ACTION 728
PERFORM SELECTED REPAIR ACTION 730
TEST PRIMARY NN 732
GENERATE REWARD SIGNAL 734
FUSE SENSOR DATA 736
GENERATE REWARD SIGNAL 738
UPDATE TRAINING OF REPAIR AGENT DURING DEPLOYMENT 740
PERFORM PRIMARY TASK WITH REPAIRED PRIMARY NN 742
OUTPUT RESULTS 744

MITIGATING EFFECTS OF DAMAGE TO NEURAL NETWORKS

CROSS-REFERENCE TO RELATED APPLICATION

This application claims the benefit of and priority to U.S. Provisional Application No. 63/121,817, entitled "Mitigating Effects of Damage to Neural Networks", filed Dec. 4, 2020, which is incorporated by reference herein in its entirety.

BACKGROUND

Radiation damage to solid state electrical components, sensors, data in memory, and logic states poses a threat in many aerospace applications, such as high-altitude aircraft, earth-orbiting satellites, and deep space probes. Radiation may cause errors in processing that are not immediately obvious, for example, a neural network (NN) that is used to classify images may produce erroneous results. Traditional solutions focus on using redundant hardware to compensate for the expected damage, for example, using voting from a plurality of different hardware systems. That adds cost and complexity, and weight to aircraft and spacecraft. Other solutions include fortifying chipsets to be radiation hardened. This requires fabricating special chipsets and adds cost.

Recent advances in computing hardware have allowed new applications in edge computing relating to machine learning and neural networks. Unfortunately, the classic problem of radiation damage to such systems remains, and the traditional solutions may introduce excessive cost and complexity. Thus, neural networks remain susceptible to errors when deployed and operated in the presence of radiation.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples provided herein include software-based solutions that mitigate effects of physical damage (e.g., radiation damage) to neural networks (NNs), such as convolutional NNs (CNNs) performing image classification or object detection while deployed on an aircraft or an earth-orbiting satellite. Additional artificial intelligence (AI) or machine learning (ML), collectively ML, solvers addressing other types of tasks may also benefit, beyond CNNs. An example includes: deploying, on a platform, a primary NN and a repair agent, the primary NN trained to perform a primary task and the repair agent trained to repair the primary NN; and during the deployment: detecting, by the repair agent, a degradation of the primary NN's ability to perform the primary task; selecting, by the repair agent, a repair action to perform on the primary NN; performing the selected repair action to repair the primary NN; and performing the primary task by the repaired primary NN. Some examples provide for further training of the repair agent during deployment. Some examples provide for physics-based training of the repair agent by subjecting an NN to radiation during repair agent training.

The features, functions, and advantages that have been described are achieved independently in various examples or are to be combined in yet other examples, further details of which are seen with reference to the following description and drawings.

BRIEF DESCRIPTION OF THE DRAWINGS

The disclosed examples are described in detail below with reference to the accompanying drawing figures listed below:

FIG. 7 is a flow chart 700 illustrating a method of mitigating damage to NNs, as may be used with the arrangement 100 of FIG. 1, in accordance with an example.

Corresponding reference characters indicate corresponding parts throughout the drawings in accordance with an example.

DETAILED DESCRIPTION

Figure 1:
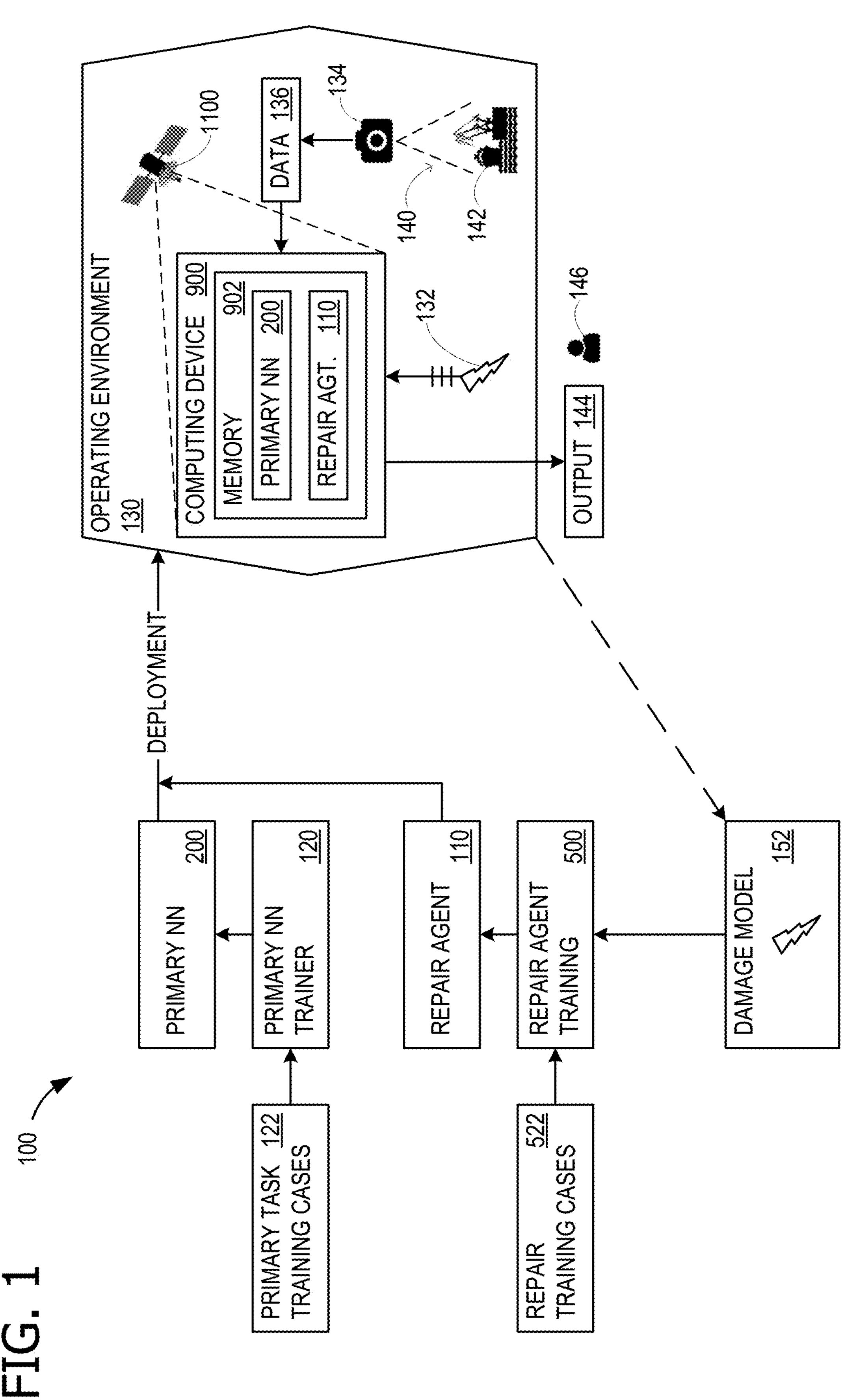
FIG. 1 illustrates an arrangement 100 that advantageously mitigates damage to neural networks (NNs), for example a primary NN 200, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings.

As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects and implementations disclosed herein are directed to software-based solutions that mitigate effects of physical damage (e.g., radiation damage) to neural networks (NNs), such as convolutional NNs (CNNs) performing image classification or object detection while deployed on an aircraft or an earth-orbiting satellite. Additional ML solvers, beyond CNNs, addressing other types of tasks, may also benefit. An example includes: deploying, on a platform, a primary NN and a repair agent, the primary NN trained to perform a primary task and the repair agent trained to repair the primary NN; and during the deployment: detecting, by the repair agent, a degradation of the primary NN's ability to perform the primary task; selecting, by the repair agent, a repair action to perform on the primary NN; performing the selected repair action to repair the primary NN; and performing the primary task by the repaired primary NN. Some examples provide for further training of the repair agent during deployment. Some examples provide for physics-based training of the repair agent by subjecting an NN to radiation during repair agent training.

Aspects of the disclosure have a technical effect of improved operation of a computer, for example by reducing erroneous output, improving the efficiency of computational hardware, and provide better allocation of resources, as compared to traditional systems that rely on, for example error correction and voting logic. Aspects of the disclosure are able to advantageously repair a primary NN using an autonomous repair agent, during deployment in an operating environment aboard a platform, such as an aircraft, earth-orbiting satellite, or other platform. The primary NN is trained to perform a primary task, such as image classification or object detection, recognition, or location, while the operating environment exposes the primary NN to damage, such as radiation damage, cyber-attack, malware (a virus), or some other type of damage. The repair agent (which may also comprise an NN) is trained to repair the primary NN, for example using constrained reinforcement learning with a physics-based approach. The repair agent determines whether the primary NN requires repair and takes appropriate repair actions, such as adjusting a node weight, removing a node, adjusting a connection, adding a connection, and/or removing a connection.

Referring more particularly to the drawings, FIG. 1 illustrates an arrangement 100 that advantageously mitigates damage to neural networks (NNs), for example a primary NN 200, in accordance with an example. As illustrated, the arrangement 100 includes the primary NN 200 and a repair agent 110 that are deployed in an operating environment 130 on a platform (an apparatus 1100) and hosted on a computing device 900, which is described in further detail in relation to FIG. 9. The apparatus 1100 is illustrated as an earth-orbiting satellite and is described in further detail in relation to FIGS. 11 and 13. Other examples are also contemplated, as described below.

Figure 2:
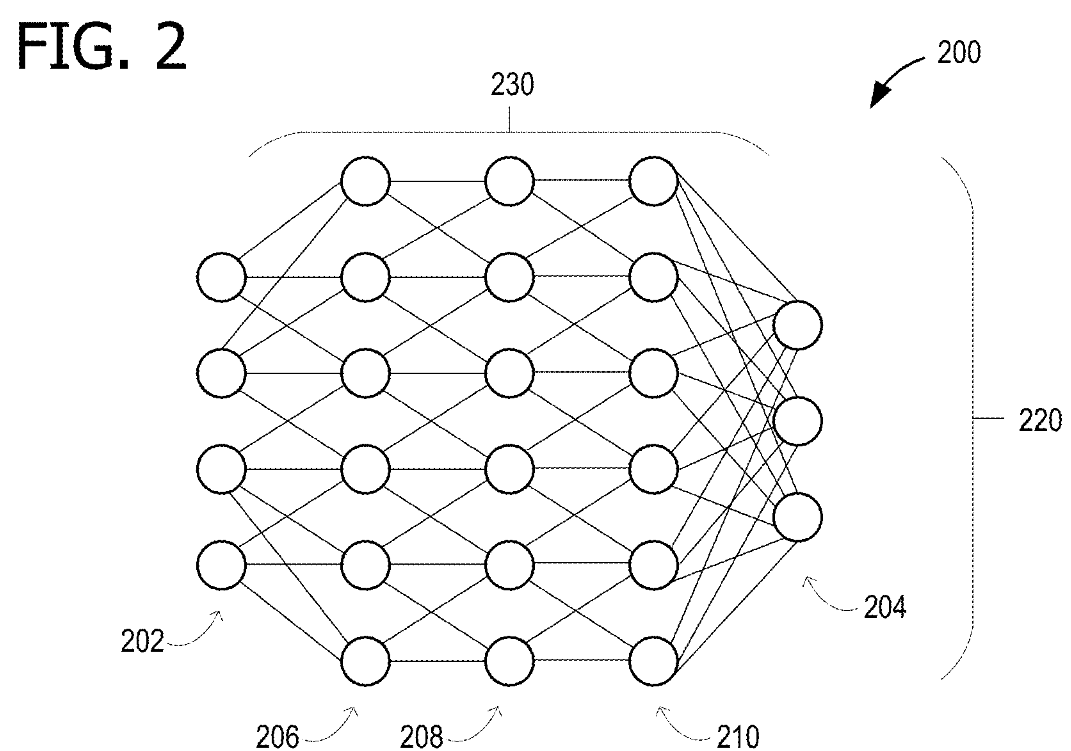
FIG. 2 illustrates an implementation of the primary NN 200, in accordance with an example.

Turning briefly to FIG. 2, the primary NN 200 is illustrated as a plurality of nodes 220 (e.g., neurons) arranged into a plurality of layers 202, 204, 206, 208, and 210, and connected with a plurality of connections 230. It should be understood that a different number of nodes and layers may be used in other examples. Layer 202 is an input layer, layer 204 is an output layer, and layers 206-210 are hidden layers. For clarity of illustration, not all connections 230 among the nodes 220 are drawn. In an example, the primary NN 200 comprises data (e.g., nodes and weights) within a memory 902 and is implemented using computer executable instructions (e.g., instructions 902*a*) on the computing device 900. In some examples, the primary NN 200 comprises a convolutional neural network (CNN). In some examples, the primary NN 200 is able to perform image classification. In some examples, the primary NN 200 is able to perform object recognition, object detection, and/or object locations (e.g., determining the location of an object within a larger image). In some examples, the primary NN 200 performs different tasks, other than computer vision (CV) type tasks. In some examples, the primary NN 200 is not a CNN and performs a task outside CV (e.g. a non-CV task), and comprises an ML component selected from a list consisting of: a recurrent neural network (RUN), a long term short term memory (LSTM), and a Markov chain (MC), or some other type of NN or ML component.

Returning to FIG. 1, the primary NN 200 is operated in the operating environment 130, which in the illustrated case is on board a platform that is an earth-orbiting satellite (apparatus 1100). This is an inhospitable environment because the apparatus 1100 is susceptible to damage 132, such as high levels of radiation. The damage may be sufficiently severe to negatively impact traditionally trained NNs. Other potential target operating environments 130 include onboard: an aircraft, an earth-orbiting satellite, a deep space probe, a solar probe, a planetary probe, and in a ground-based environment with expected radiation exposure (e.g., a nuclear power plant). Aspects of the disclosure may be applicable to other forms of networks, for example physical networks, and the damage may be other than radiation damage, but instead may be damage to networks via malicious logic (e.g., viruses) and/or hackers. That is, damage may be random loss of information for any reason, including cyber-attacks and computer viruses. The result of the damage 132 is a degradation of the ability of the primary NN 200 to perform its primary task.

However, it may be desirable to have the capabilities on an NN in certain inhospitable environments, due to the performance offered by NNs for tasks such as image classification and object recognition. As illustrated, a sensor 134 (e.g., a camera, infrared sensor, hyperspectral sensor, or a synthetic aperture radar) images a scene 140 that contains an object 142, such as a vehicle (e.g., a ship, as illustrated). Output of the sensor 134 becomes input data 136 that is received by the primary NN 200. Based at least receiving the input data 136, the primary NN 200 generates an output 144 for a user 146. In some examples, the output 144 is image classification for the scene 140. In some examples, the output 144 is recognition of the object 142. In some examples, the output 144 is location of the object 142 within an image, relative to other objects.

Without a solution to render the primary NN 200 robust in the presence of the damage 132, performance of the primary NN 200 may degrade. Thus, a damage model 152 represents the damage 132 that may be anticipated within the target (planned) operating environment 130 of the primary NN 200. In one example, the damage model 152 comprises expected physical radiation damage to the computing device 900 hosting the primary NN 200. In some scenarios, such radiation is Brownian (random). In some scenarios, the damage is a virus (e.g., a computer virus or other malware) or a cyber-attack.

The primary NN 200 is trained for its primary task (e.g., processing the input data 136 to generates the output 144, as described above) by a primary NN trainer 120 using a set of labeled training data shown as primary task training cases 122. In some examples, the training of the primary NN 200 occurs on a computing device 900, which may be the same or a different computing device 900 as hosts the primary NN 200 in the operating environment 130. The repair agent 110 is trained for its task of repairing the primary NN 200 from the damage 132 in a repair agent training environment 500, using the damage model 152 and a set of repair test cases 522. The repair agent 110, training of the repair agent 110, and repair agent training environment 500 are described in further detail in relation to FIG. 5.

During operation of the primary NN 200, some of nodes 220 and/or connections 230 may become damaged. However, because the repair agent 110 has been trained to repair the primary NN 200, the primary NN 200 may be repaired and continue to provide sufficient performance.

Figure 3:
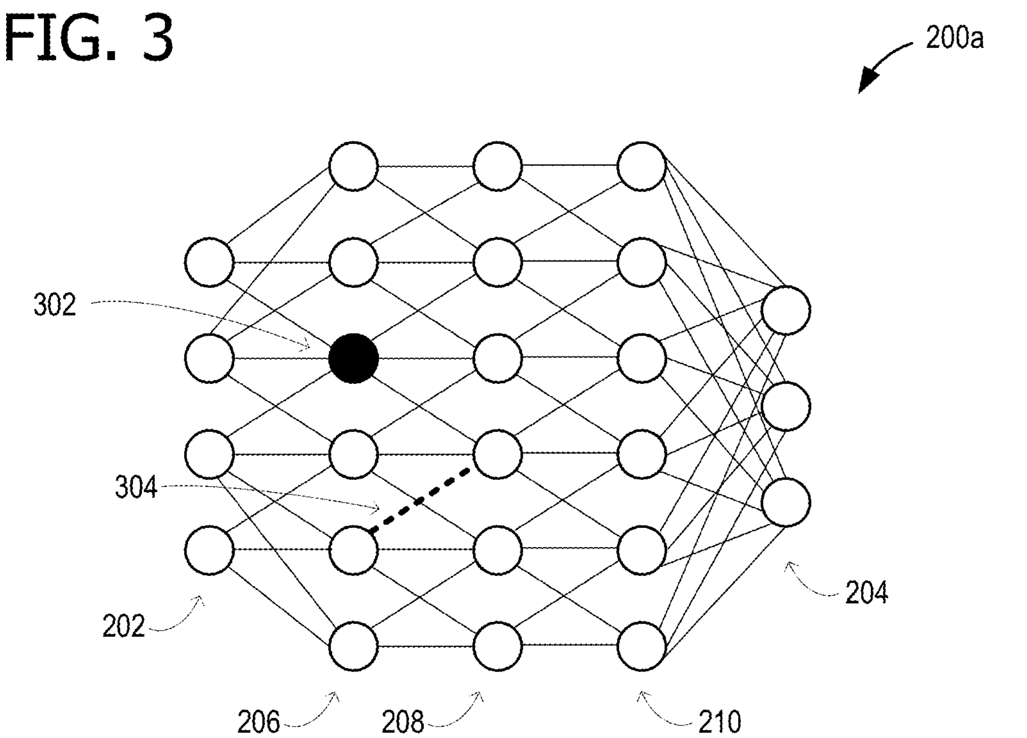
FIG. 3 illustrates damage to the primary NN 200 of FIG. 2 (now shown as a damaged primary NN 200*a*) during deployment, in accordance with an example.
Figure 4:
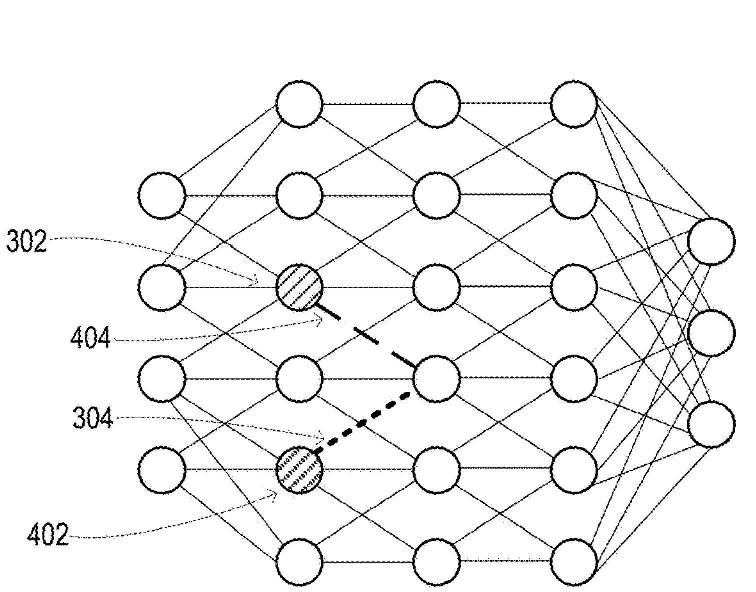
FIG. 4 illustrates repair to the damaged version primary NN 200*a* of FIG. 3 (now shown as a repaired primary NN 200*b*) during deployment, in accordance with an example.

FIG. 3 illustrates damage to the primary NN 200, and is shown as a damaged primary NN 200*a*. For simplicity of illustration only a single node 302 and a single connection 304 are illustrated as being damaged. It should be understood, however, that in some examples, a larger number of nodes and connections may be damaged. Damage may include a change of a value or an inversion of a logic state, or even permanent physical damage to a part of the memory 902 that stores values or logic states. FIG. 4 illustrates repair to the damaged primary NN 200*a*, and is shown as a repaired primary NN 200*b*.

Repair actions may include adjusting one or more node weights, removing one or more nodes, adjusting one or more connections (e.g., changing connection values), adding one or more connections, and/or removing one or more connection. As indicated in FIG. 4, the node 302 is altered, a node 402 is altered, and a connection 404 is altered. In the illustrated example, the connection 304 is left unchanged from its damaged state. This indicates that the repair agent 110 may not necessarily return the primary NN 200 to its exact pre-damage state, but may instead repair it so that it functions better than in its damaged state. For example, the repaired primary NN 200*b* may not function identically to the (original, undamaged) primary NN 200, but should have superior performance to the damaged primary NN 200*a*. In some examples, the repair agent 110 may return the primary NN 200 to its pre-damage state.

Figure 5:
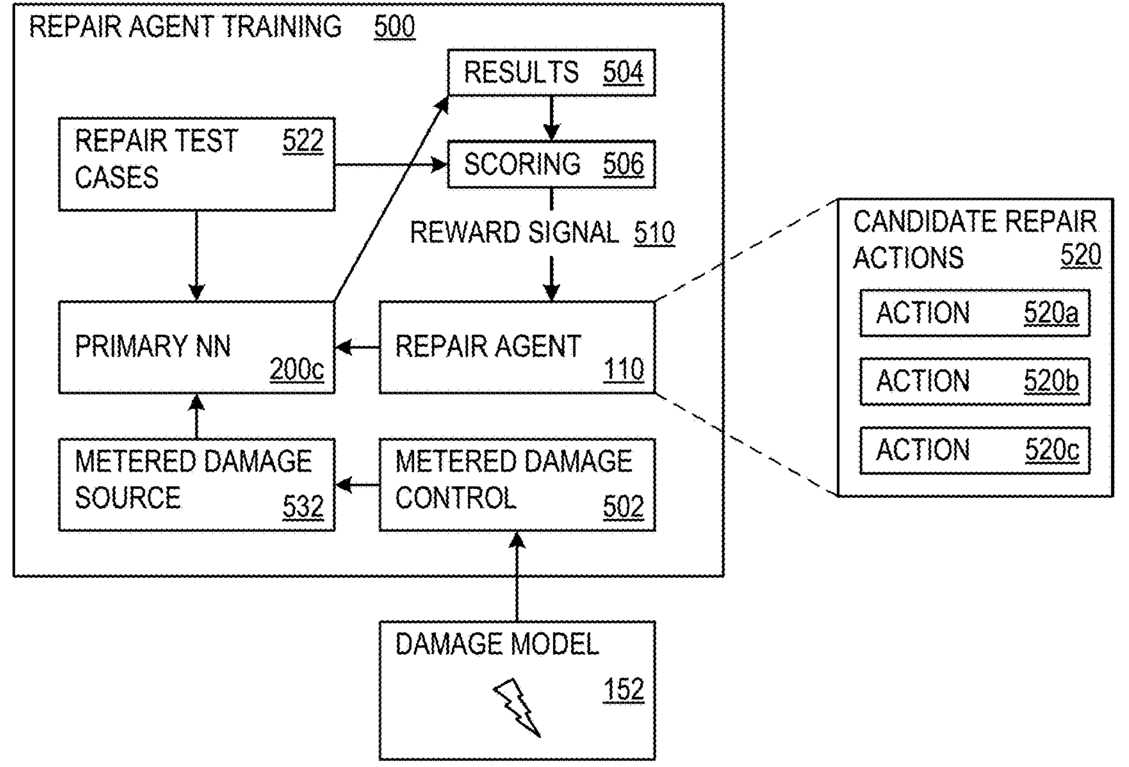
FIG. 5 illustrates a repair agent training environment 500 that trains a repair agent 110 to mitigate damage to the primary NN 200, for example changing the damaged primary NN 200*a* into the repaired primary NN 200*b*, in accordance with an example.

Turning now to FIG. 5, the repair agent training environment 500 is illustrated in further detail. In some examples, the repair agent training environment 500 provides a physics-based training approach because physical damage is inflicted on a primary NN 200*c* during training. The primary NN 200*c* may be a copy of the primary NN 200 that is used for training the repair agent 110, but because it will be intentionally damaged, it may not be the copy that is deployed to the operating environment 130. The damage model 152 is used by a metered damage control 502 to adjust the damage output of a metered damage source 532. The metered damage source 532 may be a radiation source, or some other source of damage (e.g., a simulation of malicious logic or a cyber-attack). As a result, the primary NN 200*c* becomes damaged and suffers a degradation of its ability to perform its primary task. In some examples, this condition is detected by passing a portion of a set of repair test cases 522 through the primary NN 200*c*. In some examples, the repair test cases 522 may include a subset of the primary task training cases 122.

The repair agent 110 has a set of candidate repair actions 520, illustrated as comprising candidate repair action 520*a*, candidate repair action 520*b*, and candidate repair action 520*c*. It should be understood that the number of candidate repair actions may be significantly larger, in some examples. The repair agent 110 selects a candidate repair action (e.g., selects the candidate repair action 520*a*), repairs the primary NN 200*c*, and assess the repair action by passing a portion of the set of repair test cases 522 through the primary NN 200*c*. After the repair, results 504 of the primary NN 200*c* performing its primary task on repair test cases 522 are scored by a scoring component 506 (e.g., by comparing the results 504 with labels in repair test cases 522), and a reward signal 510 is generated for the repair agent 110 to update its policies.

Reward signals are used by reinforcement learning agents for training. For example, the repair agent 110 is rewarded if the performance of the primary NN 200*c* improves (e.g., classification accuracy increases), making similar decisions more likely to occur in the future, whereas the repair agent 110 is negatively rewarded if the performance of the primary NN 200*c* fails to increase sufficiently (e.g., classification accuracy decreases or increases below some threshold), making similar decisions less likely to occur in the future. Thousands of epochs may be used during the training, providing thousands of the reward signal 510 to the repair agent 110.

For example, if the repair agent 110 selects the candidate repair action 520*a*, which it to add a connection between two nodes, and the result is improved accuracy of the primary NN 200*c*, then the candidate repair action 520*a* will be more likely to selected in the future (e.g., when primary NN 200 is later deployed to the operating environment 130). If, however, the repair agent 110 selects the candidate repair action 520*b*, which is to drop a connection between two nodes, and the result is degraded accuracy of the primary NN 200*c*, then the candidate repair action 520*b* will be less likely to selected in the future.

Figure 6:
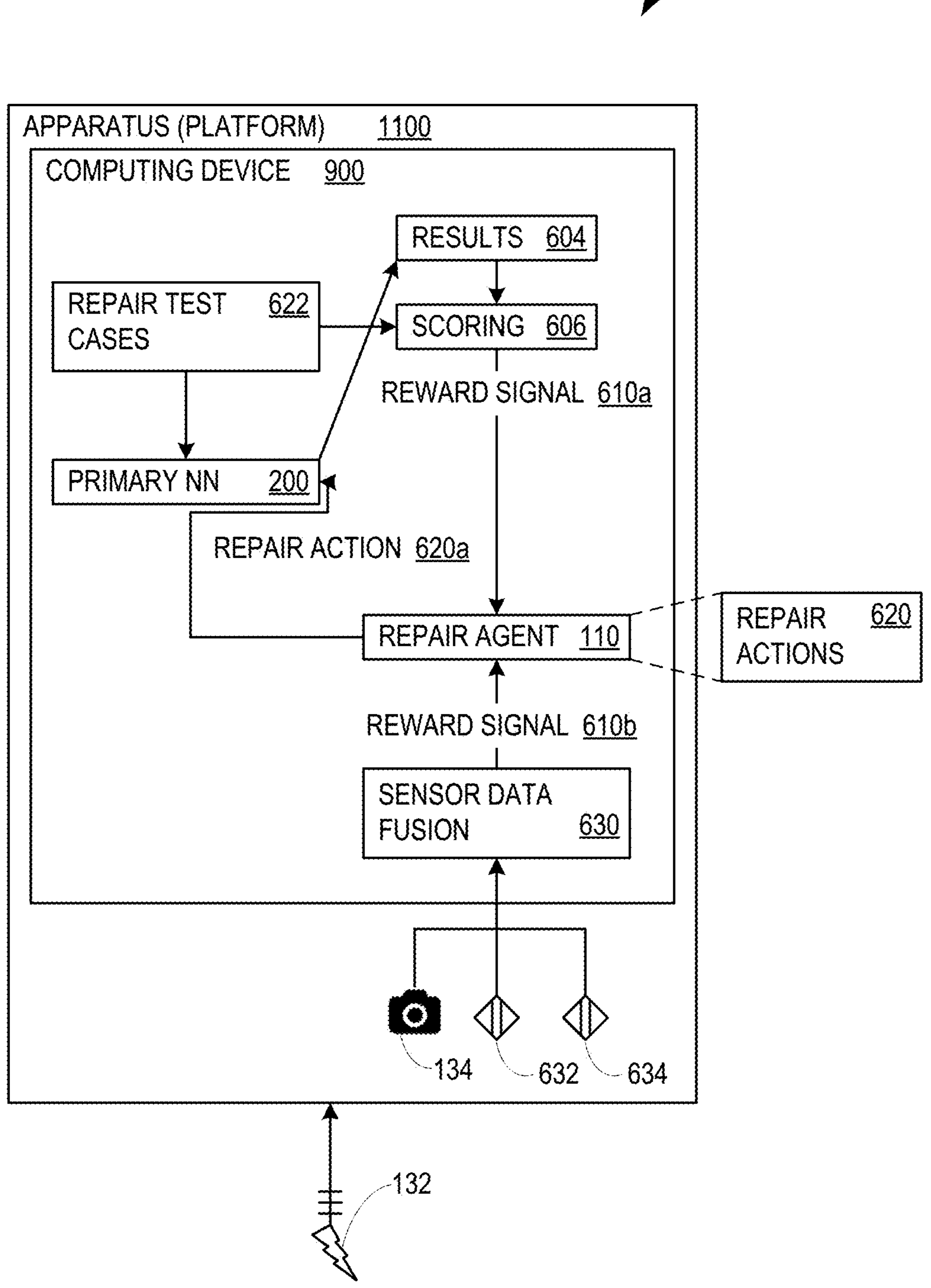
FIG. 6 illustrates update training of the repair agent 110 during deployment, in accordance with an example.

FIG. 6 illustrates update training of the repair agent 110 during deployment on the apparatus 1100 (the deployment platform), which may be beneficial in the event that the repair agent 110 is itself also damaged by the damage 132. Two options for reward signals are shown. A first reward signal 610*a* is generated similarly to the training of the repair agent 110 in the repair agent training environment 500 of FIG. 5. When the primary NN 200 (the deployed copy) becomes damaged and suffers a degradation of its ability to perform its primary task, this condition is detected by passing a set of repair test cases 622 through the primary NN 200. In some examples, the repair test cases 622 may include a subset of the primary task training cases 122 and/or be similar to the repair test cases 522. In some examples, the assessment of possible damage occurs 20 times per second The repair agent 110 has a set of candidate repair actions 620, which may be similar to the set of candidate repair actions 520. The repair agent 110 selects a candidate repair action, repairs the primary NN 200, and assesses the repair action by passing a portion of the set of repair test cases 622 through the primary NN 200. After the repair, results 604 of the primary NN 200 performing its primary task on repair test cases 622 are scored by a scoring component 606 (e.g., by comparing the results 604 with labels in repair test cases 622), and the reward signal 610*a* is generated for the repair agent 110 to update its policies.

However, in some examples, the repair test cases 622 may not be used or fully trusted because the repair test cases 622 may be corrupted by the damage 132. In such examples, the training of the repair agent 110 is updated during the deployment using an open-loop solution that estimates a confidence that repairs are correct and produces a second reward signal 610*b* (in place of or in addition to the reward signal 610*a*). A plurality of sensors may be employed, for example, including camera (visible light and/or infrared) audio, vibration, radiation, and temperature sensors. The sensor 134 is illustrated (although a different camera may be used), along with an additional sensor 632 and another additional sensor 634. Sensor data is fused with a sensor data fusion 630 to estimate an effectiveness of the selected repair action. For example, sensor data fusion 630 may fuse sensor data from the sensors 134, 632, and 634. The use of multiple sensors, and fusing their output data, is to allow for the possibility that one of the sensors has erroneous output due to the sensor experiencing radiation damage (or some other type of damage).

For example, in an aerial refueling scenario, in which the platform (e.g., the apparatus 1100) is an aircraft, a camera provides an image in which a refueling boom and a fuel port may be located, and an audio sensor provides sound data that may be interpreted as a click of fuel components connecting or a banging noise of the refueling boom missing the fuel port and striking the other aircraft. Additionally, a vibration sensor may pick up vibrations which may match or fail to match the vibrations expected when a refueling boom engages a fuel port. In this manner, the training of the repair agent 110 may be updated during deployment using the reward signal 610*a* and/or the reward signal 610*b*.

With reference now to FIG. 7, a flow chart 700 illustrates a method of mitigating damage to NNs (e.g., the primary NN 200). In some examples, the operations illustrated in FIG. 7 are performed, at least in part, by executing instructions 902*a* (stored in the memory 902) by the one or more processors 904 of the computing device 900 of FIG. 9. For example, the primary NN 200 may be trained on a first example of the computing device 900 and then deployed in the operating environment 130 on a second (different) example of the computing device 900. Operation 702 includes training the primary NN 200 for the primary task. In some examples, the primary NN 200 comprises a CNN. In some examples, the primary task comprises image classification, object detection, object recognition, or object location.

Operation 704 includes training the repair agent 110 using operations 706-714. In some examples, the repair agent 110 comprises a reinforcement learning agent. In some examples, each training stage is an entire epoch (a cycle through an entire training data set), and thousands of iterations are used. Operation 706 includes subjecting an NN (e.g., the primary NN 200*c*, which is a copy of the primary NN 200) to radiation or other damage. In some examples the intensity of the radiation (during training) matches the intensity of the radiation expected in the operating environment 130. This may be controlled as described above for FIG. 5. Operation 708 includes selecting a candidate repair action (e.g., the repair agent 110 selects the candidate repair action 520*a*) In some examples, the candidate repair action comprises adjusting a node weight, removing a node, adjusting a connection, adding a connection, and/or removing a connection.

Operation 710 includes performing the candidate repair action, and operation 712 includes assessing the effectiveness of the candidate repair action. Operation 714 includes, based on at least the candidate repair action, receiving the reward signal 510. In some examples, the repair agent 110 uses the reward signal 510 to reinforce more effective candidate repair action selections or to deter less effective candidate repair action selections. Reinforcement learning is a machine learning approach where the goal is for an agent in some environment E to learn some policy P that describes what action A to take when in state S, that maximizes on the expected sum of returns based on some reward function R(A,S). Multiple reinforcement learning algorithms may be employed, including, Deep Q Networks (DQN), Normalized Advantage Functions (NAF), Asynchronous Advantage Actor-Critic (A3C), and Deep Deterministic Policy Gradient (DDPG). Additionally, memory replay may also be used during the training of the repair agent 110.

Deployment on a platform (e.g., the apparatus 1100) in the operating environment 130 occurs in at 716. Operation 716 includes deploying, on a platform, a copy of the primary NN 200 and the repair agent 110, the primary NN 200 trained to perform a primary task and the repair agent 110 trained to repair the primary NN 200. In some examples, the platform comprises a deployment location selected from a list consisting of: a spacecraft, an aircraft, and an earth-orbiting satellite. Other operating environments may include onboard a deep space probe, a solar probe, a planetary probe, and in a ground-based environment with expected radiation exposure (e.g., a nuclear power plant). It should be understood that repair operations are not limited to repairing damage from radiation, but may also include other types of damage, such as cyber-attack and other types of physical damage. Operation 718 includes operating the primary NN 200 under the care of the repair agent 110 during the deployment, and includes operations 720-744. The damage 132 occurs at 720. In some examples, the damage 132 comprises a type selected from a list consisting of: radiation damage, malicious logic (a virus), cyber-attack, and other physical damage. Radiation damage may be consistent and slowly degrade network architecture or may be sudden, for example as a result of a large burst.

Operation 722 includes sensing radiation, or some other damaging condition, at the platform, and operation 724 includes, based at least on sensing radiation (or other damaging condition) at the platform, activating the repair agent 110. That is, in some examples, the repair agent 110 is activated based on detecting a potentially damaging event, whereas in other examples, the repair agent 110 may be on continuously, and monitoring the primary NN 200. Operation 726 includes detecting, by the repair agent 110, a degradation of the primary NN 200's ability to perform the primary task. In some examples, the degradation of the primary NN 200's ability to perform the primary task is caused at least by radiation damage. In some examples, detecting the degradation of the primary NN 200's ability to perform the primary task comprises testing the primary NN 200 using a set of test cases (e.g., the repair test cases 622). In some examples, sensor data fusion is used to assess damage. In some examples, the assessment of possible damage (extent and type) occurs 20 times per second.

Operation 728 includes selecting, by the repair agent 110, a repair action to perform on the primary NN 200. In some examples, the selected repair action comprises adjusting a node weight, removing a node, adjusting a connection, adding a connection, and/or removing a connection. In some examples, an entire layer may be removed by the repair agent 110. Operation 730 includes performing the selected repair action to repair the primary NN 200. One or both options for scoring the repair may be used. Operations 732 and 734 use a closed-loop technique with a set of on-board test cases (e.g., the repair test cases 622), and operations 736-738 use an open-loop technique using sensor data fusion. Operation 732 includes, during the deployment, testing the primary NN 200 after performing the selected repair action, to determine an effectiveness of the selected repair action, and operation 734 includes, based on at least the effectiveness of the selected repair action (e.g., by testing the primary NN 200 after performing the selected repair action, scoring the performance by the primary NN 200, and determining an improvement in the score, as described for FIG. 5 or 6), generating the reward signal 610*a* to update training of the repair agent 110 during the deployment. Operation 736 includes, during the deployment, fusing sensor data from a plurality of sensors (e.g., the sensor 134 and the sensors 632 and 634) to estimate an effectiveness of the selected repair action, and operation 738 includes, based on at least the effectiveness of the selected repair action, generating the reward signal 610*b* to update training of the repair agent 110 during the deployment. In some examples, the plurality of sensors comprises at least two sensors selected from a list consisting of: a radiation sensor, an optical sensor, an audio sensor, an inertial sensor, and a vibration sensor.

With the assessment of the effectiveness of the repair action now available as the reward signal 601*a* and/or the reward signal 610*b*, operation 740 includes updating the training of the repair agent 110 during the deployment. Operation 742 includes performing the primary task by the repaired primary NN 200*b*, and operation 744 includes outputting results of performing the primary task by the repaired primary NN 200*b* (e.g. generating the output 144 for the user 146).

Figure 8A:
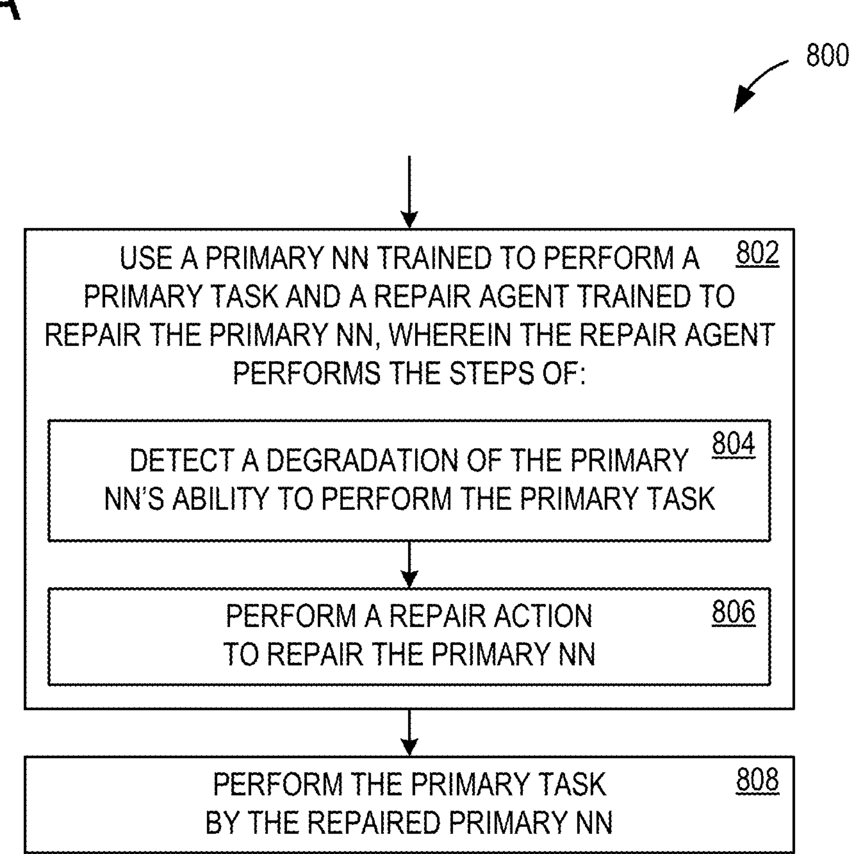
FIG. 8A is a flow chart 800 illustrating another method of mitigating damage to NNs, as may be used with the arrangement 100 of FIG. 1, in accordance with an example.

FIG. 8A also shows a flow chart 800 illustrating a method of mitigating damage to NNs. In some examples, operations illustrated in FIG. 8A are performed, at least in part, by executing instructions by the one or more processors 904 of the computing device 900 of FIG. 9. Operation 802 includes using a primary NN trained to perform a primary task and a repair agent trained to repair the primary NN, wherein the repair agent performs operations 804 and 806. Operation 804 includes detecting a degradation of the primary NN's ability to perform the primary task. Operation 806 includes performing a repair action to repair the primary NN. Operation 808 includes performing the primary task by the repaired primary NN.

Figure 8B:
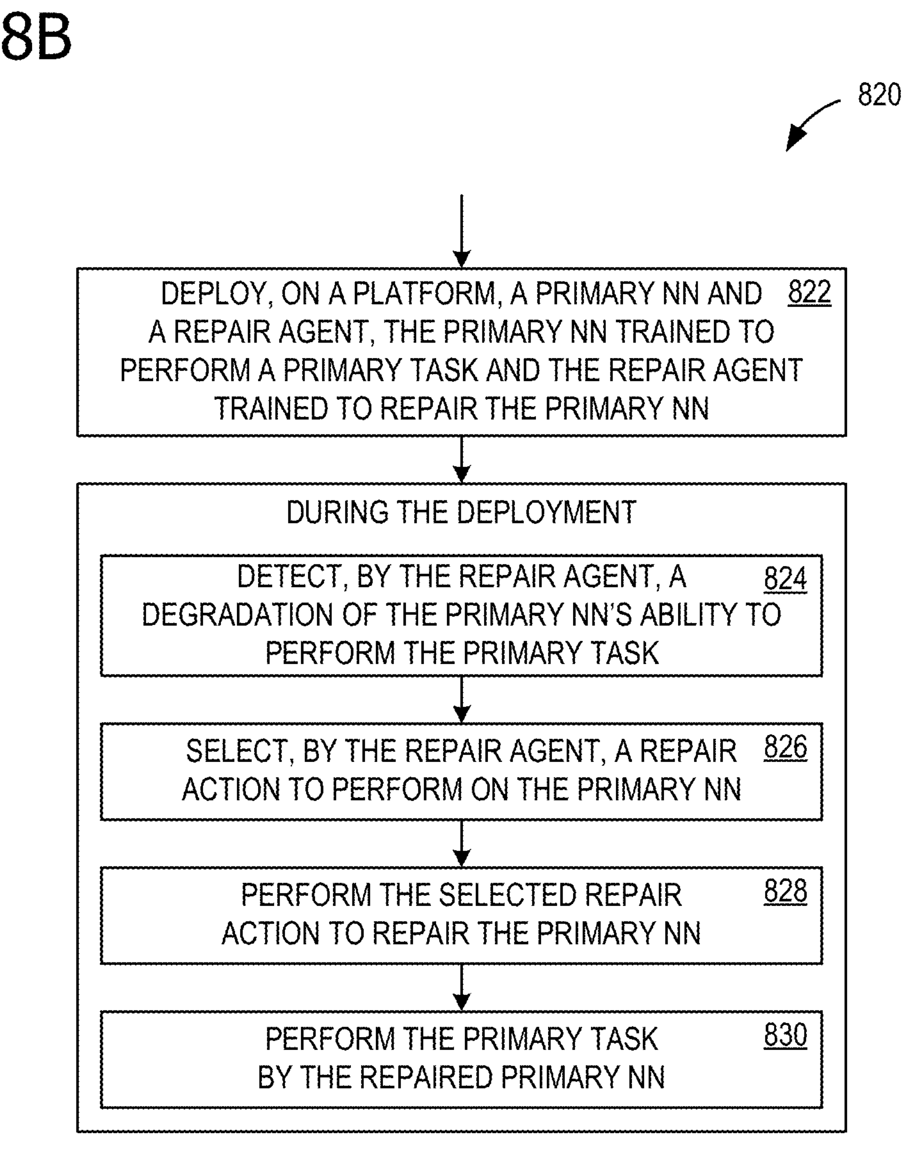
FIG. 8B is a flow chart 820 illustrating another method of mitigating damage to NNs, as may be used with the arrangement 100 of FIG. 1, in accordance with an example.

FIG. 8B also shows a flow chart 820 illustrating a method of mitigating damage to NNs. In some examples, operations illustrated in FIG. 8B are performed, at least in part, by executing instructions by the one or more processors 904 of the computing device 900 of FIG. 9. Operation 822 includes deploying, on a platform, a primary NN and a repair agent, the primary NN trained to perform a primary task and the repair agent trained to repair the primary NN. Operations 824 through 830 occur during the deployment. Operation 824 includes detecting, by the repair agent, a degradation of the primary NN's ability to perform the primary task. Operation 826 includes selecting, by the repair agent, a repair action to perform on the primary NN. Operation 828 includes performing the selected repair action to repair the primary NN. Operation 830 includes performing the primary task by the repaired primary NN.

Figure 9:
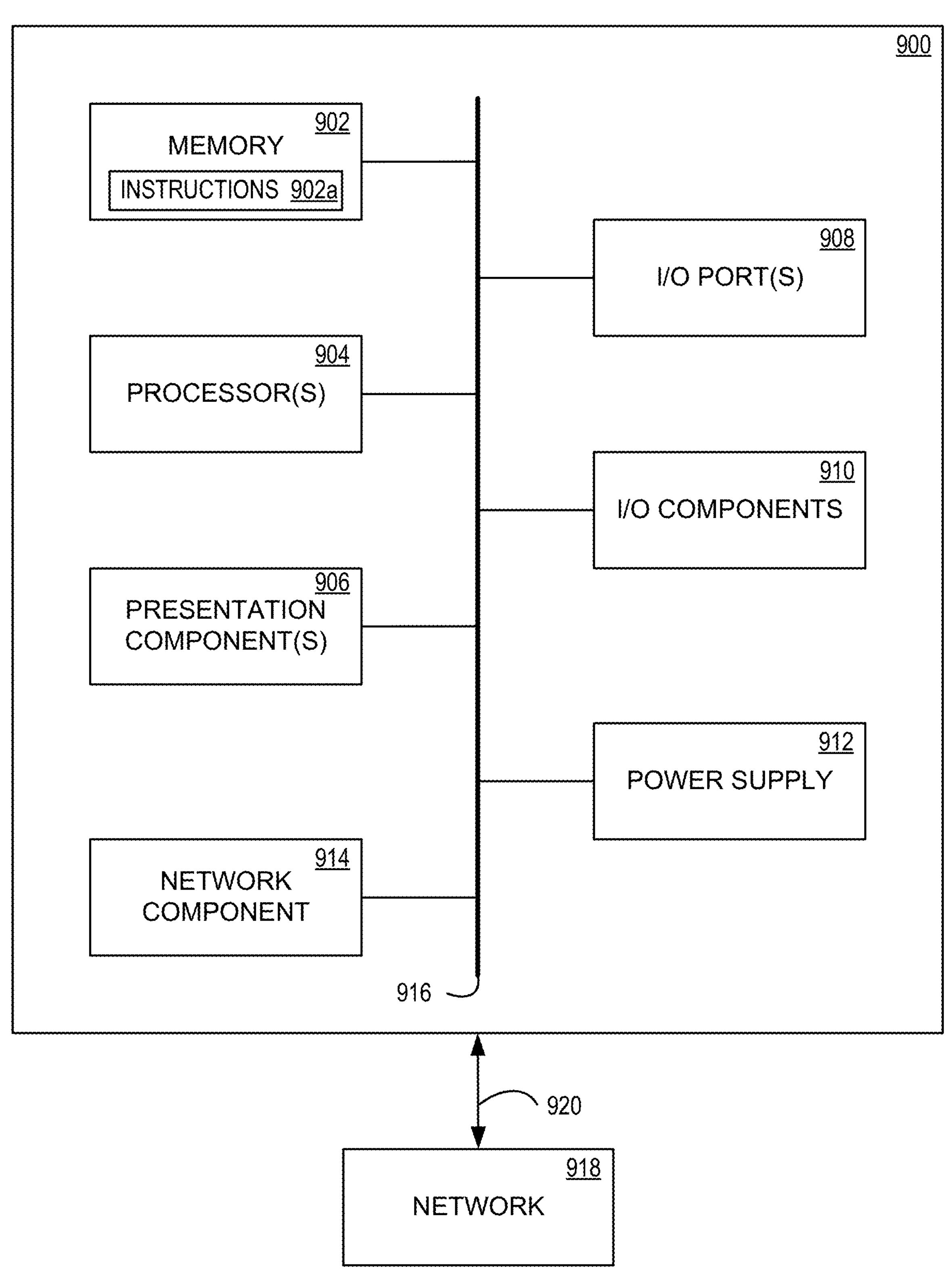
FIG. 9 is a block diagram of a computing device 900 suitable for implementing various aspects of the disclosure in accordance with an example.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902*a* configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flow charts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Implementations of the I/O components 1810 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some implementations blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
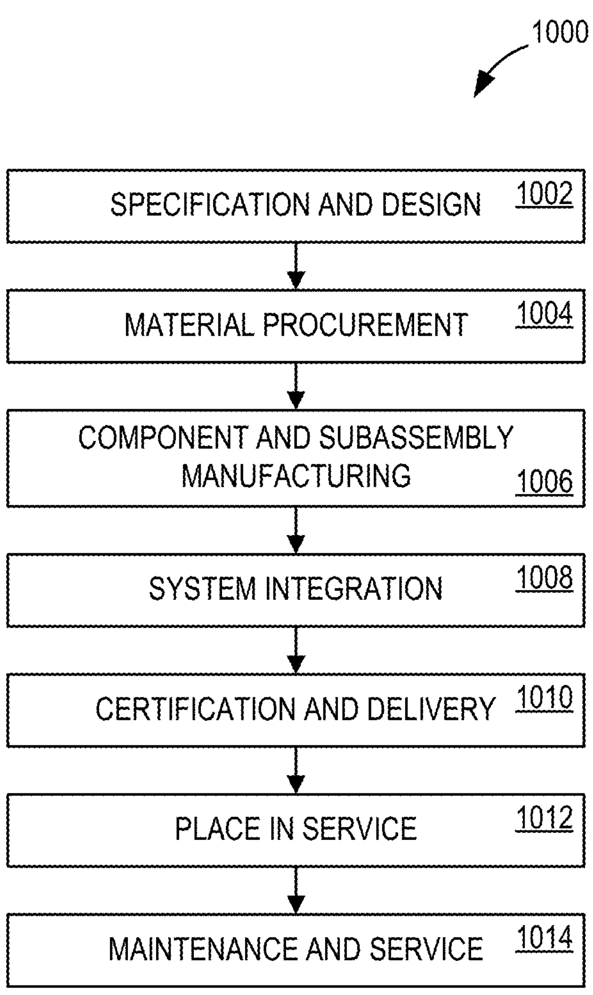
FIG. 10 is a block diagram of an apparatus production and service method 1000 that advantageously employs various aspects of the disclosure in accordance with an example.
Figure 11:
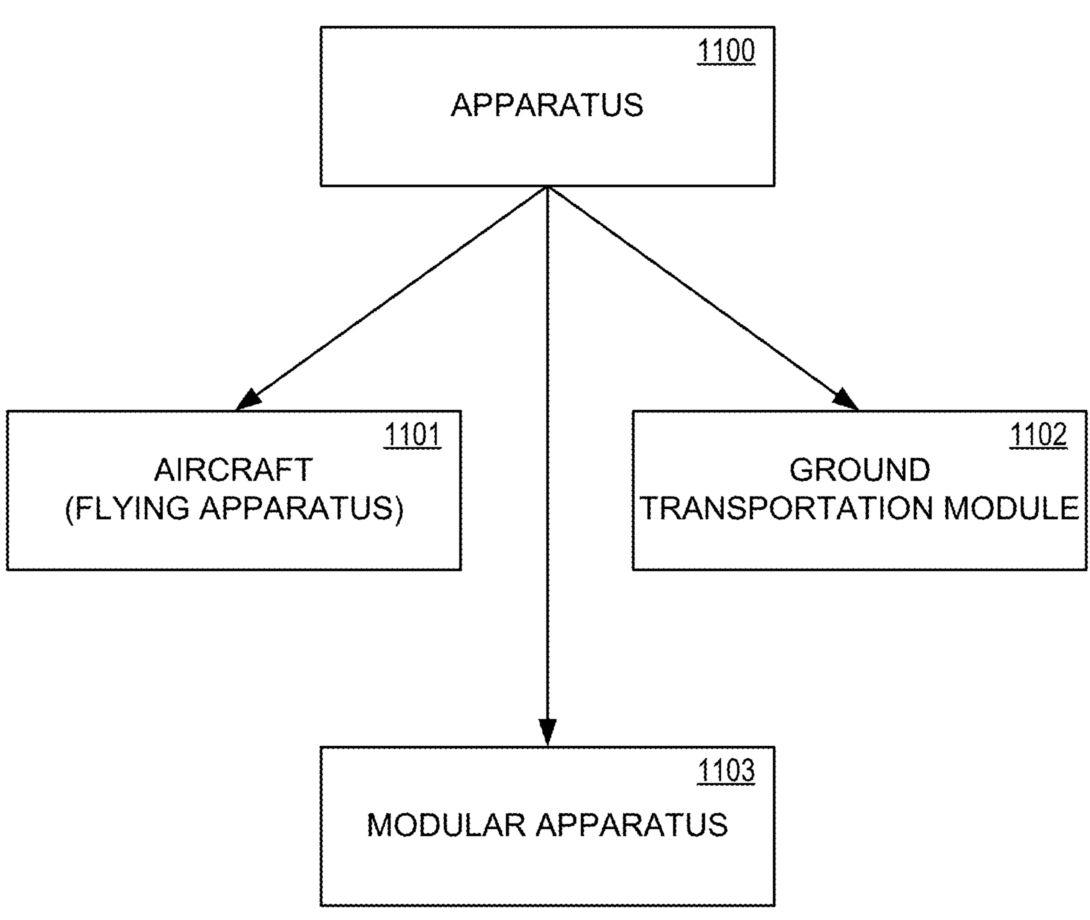
FIG. 11 is a block diagram of an apparatus 1100 for which various aspects of the disclosure may be advantageously employed in accordance with an example.
Figure 12:
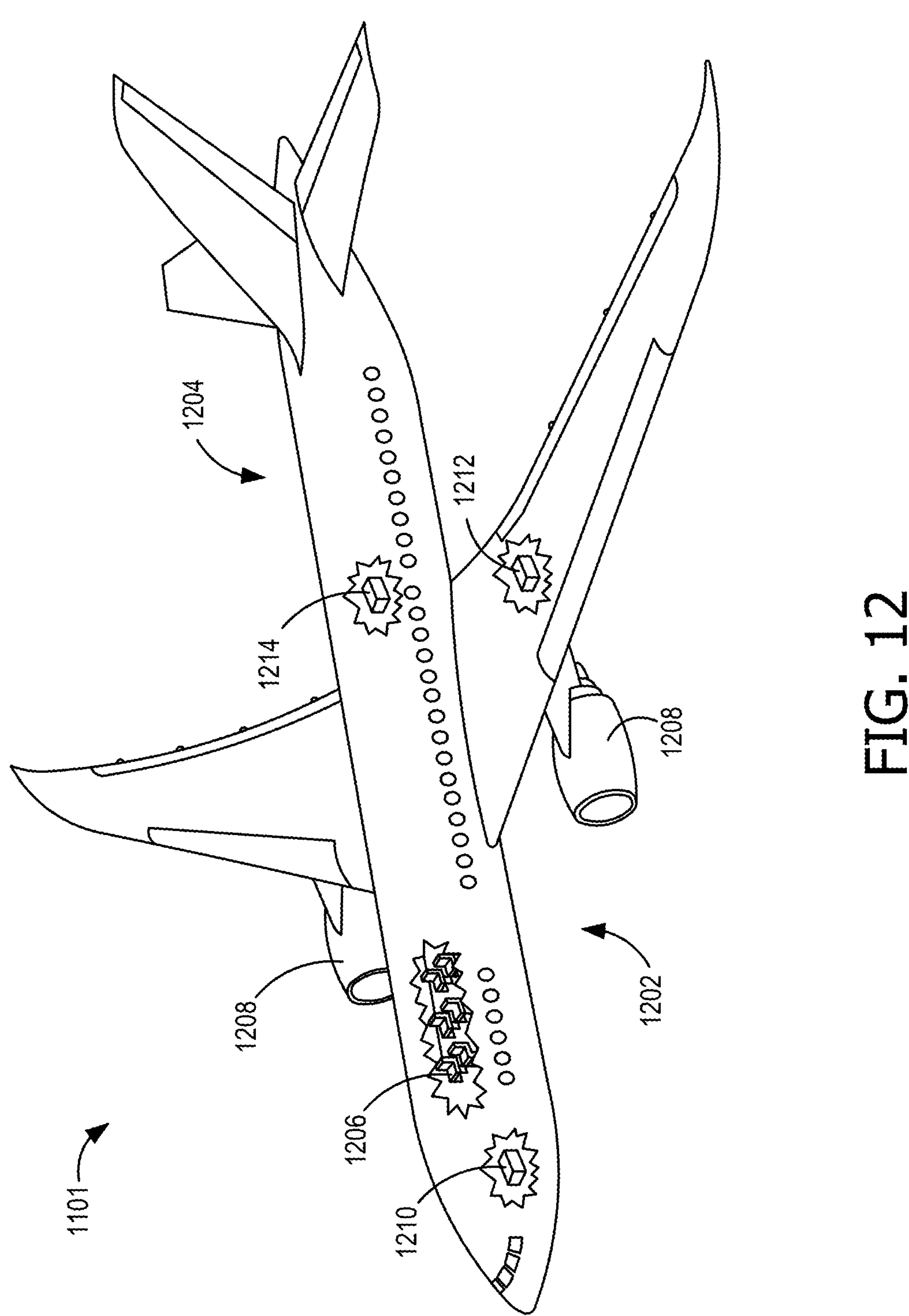
FIG. 12 is a schematic perspective view of a particular flying apparatus 1101 in accordance with an example.

Some examples of the disclosure are used in manufacturing and service applications as shown and described in relation to FIGS. 10-12. Thus, examples of the disclosure are described in the context of an apparatus of manufacturing and service method 1000 shown in FIG. 10, an apparatus 1100 shown in FIG. 11, and an apparatus 1300 shown in FIG. 13. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein;

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, satellite, planetary probe, deep space probe, solar probe, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

Figure 13:
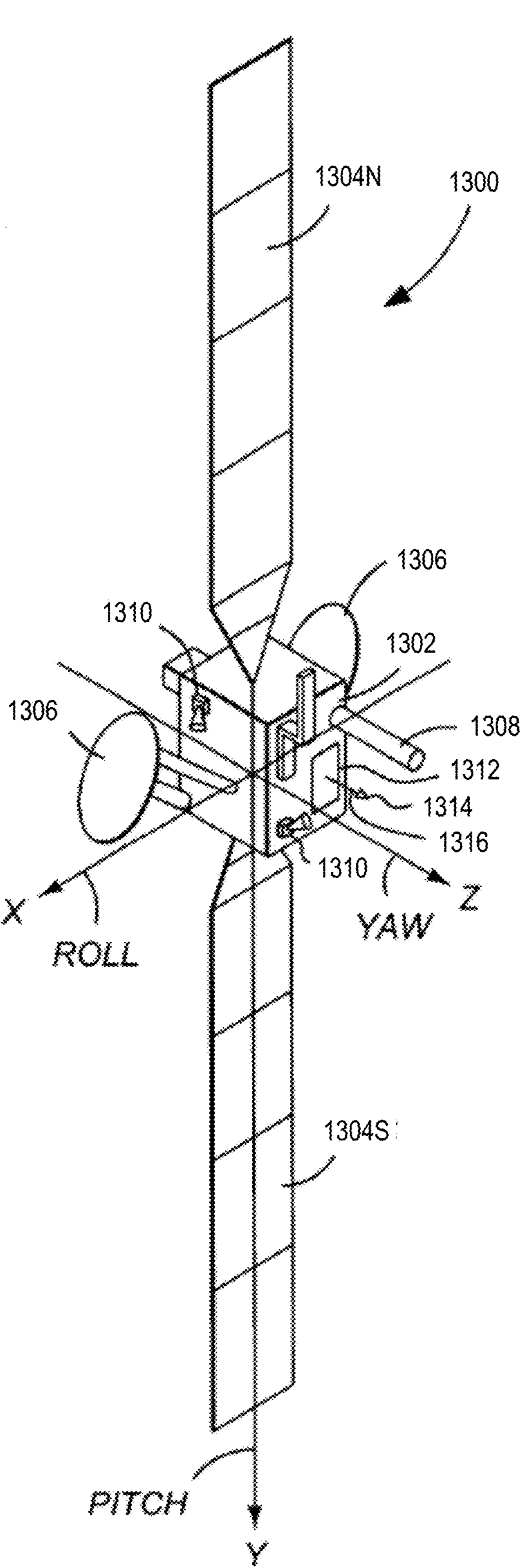
FIG. 13 illustrates a three-axis stabilized satellite or spacecraft.

FIG. 13 illustrates a three-axis stabilized satellite or spacecraft 1300, which is an example platform (an apparatus 1100) housing the primary NN 200 and the repair agent 110 for deployment in the operating environment 130. The spacecraft 1300 is either situated in a stationary (geostationary or geosynchronous) orbit about the Earth, or in a mid-Earth (MEO) or low-Earth (LEO) orbit. The spacecraft 1300 has a main body or spacecraft bus 1302, a pair of solar panels 1304, a pair of high gain narrow beam antennas 1306, and a telemetry and command omni-directional antenna 1308 which is aimed at a control ground station. The spacecraft 1300 may also include one or more sensors 1310 to measure the attitude of the spacecraft 1300. These sensors may include sun sensors, earth sensors, and star sensors. Since the solar panels are often referred to by the designations "North" and "South", the solar panels in FIG. 13 are referred to by the numerals 1304N and 1304S for the "North" and "South" solar panels, respectively.

The three axes of the spacecraft 1300 are shown in FIG. 13. The pitch axis Y lies along the plane of the solar panels 1304N and 1304S. The roll axis X and yaw axis Z are perpendicular to the pitch axis Y, and to each other, and lie in the directions and planes shown. The antenna 1308 points to the Earth along the yaw axis Z. The spacecraft 1300 includes a phased array antenna 1312 mounted on the spacecraft bus 1302 or a supporting structure. The phased array antenna 1312 can be used to transmit signals with wide angle or spot beams as desired. The spacecraft 1300 also includes a boom 1316 or other appendage, having a receiving sensor 1314, such as a receiving horn mounted on the boom so that its sensitive axis is directed substantially at the planar array. In some examples, the primary NN 200 and the repair agent 110 are internal to the spacecraft 1300 and so are not illustrated in FIG. 13.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of mitigating effects of damage to NNs onboard a platform comprises using a primary NN trained to perform a primary task and a repair agent trained to repair the primary NN, wherein the repair agent performs the steps of: detecting a degradation of the primary NN's ability to perform the primary task; and performing a repair action to repair the primary NN; and performing the primary task by the repaired primary NN.

An example system for mitigating effects of damage to NNs onboard a platform comprises: one or more processors; and a memory storing instructions that, when executed by the one or more processors, cause the one or more processors to perform operations comprising: use a primary NN trained to perform a primary task and a repair agent trained to repair the primary NN, wherein the repair agent performs the steps of: detect a degradation of the primary NN's ability to perform the primary task; and perform a repair action to repair the primary NN; and perform the primary task by the repaired primary NN.

An example computer program product comprises a computer usable medium having a computer readable program code embodied therein, the computer readable program code adapted to be executed to implement a method of mitigating effects of damage to NNs onboard a platform, the method comprising: using a primary NN trained to perform a primary task and a repair agent trained to repair the primary NN, wherein the repair agent performs the steps of: detecting a degradation of the primary NN's ability to perform the primary task; and performing a repair action to repair the primary NN; and performing the primary task by the repaired primary NN.

Another example method of mitigating effects of damage to NNs comprises: deploying, on a platform, a primary NN and a repair agent, the primary NN trained to perform a primary task and the repair agent trained to repair the primary NN; and during the deployment: detecting, by the repair agent, a degradation of the primary NN's ability to perform the primary task; selecting, by the repair agent, a repair action to perform on the primary NN; performing the selected repair action to repair the primary NN; and performing the primary task by the repaired primary NN.

Another example system for mitigating effects of damage to NNs comprises: one or more processors; and a memory storing instructions that, when executed by the one or more processors, cause the one or more processors to perform operations comprising: deploy, on a platform, a primary NN and a repair agent, the primary NN trained to perform a primary task and the repair agent trained to repair the primary NN; and during the deployment: detect, by the repair agent, a degradation of the primary NN's ability to perform the primary task; select, by the repair agent, a repair action to perform on the primary NN; perform the selected repair action to repair the primary NN; and perform the primary task by the repaired primary NN.

Another example computer program product comprises a computer usable medium having a computer readable program code embodied therein, the computer readable program code adapted to be executed to implement a method of mitigating effects of damage to NNs, the method comprising: deploying, on a platform, a primary NN and a repair agent, the primary NN trained to perform a primary task and the repair agent trained to repair the primary NN; and during the deployment: detecting, by the repair agent, a degradation of the primary NN's ability to perform the primary task; selecting, by the repair agent, a repair action to perform on the primary NN; performing the selected repair action to repair the primary NN; and performing the primary task by the repaired primary NN.

Alternatively, or in addition to the other examples described herein, examples include any combination of the following:

- the repair action to repair the primary NN is performed during deployment on the platform;
- the degradation of the primary NN's ability to perform the primary task is caused at least by radiation damage;
- the primary NN comprises a CNN;
- the primary NN comprises an ML component selected from a list consisting of: an RNN, an LSTM, and an MC;
- the primary task comprises image classification;
- the primary task comprises object detection;
- the primary task comprises object recognition;
- the primary task comprises object location;
- the primary task comprises a task outside of CV;
- the repair agent comprises a reinforcement learning agent;
- training the repair agent;
- training the repair agent comprises: subjecting an NN to radiation, selecting a candidate repair action, and based on at least the candidate repair action, receiving a reward signal;
- the candidate repair action comprises adjusting a node weight, removing a node, adjusting a connection, adding a connection, and/or removing a connection;
- the selected repair action comprises adjusting a node weight, removing a node, adjusting a connection, adding a connection, and/or removing a connection;
- during the deployment, testing the primary NN after performing the selected repair action, to determine an effectiveness of the selected repair action;
- based on at least the effectiveness of the selected repair action, generating a first reward signal to update training of the repair agent during the deployment;
- during the deployment, fusing sensor data from a plurality of sensors to estimate an effectiveness of the selected repair action;
- based on at least the effectiveness of the selected repair action, generating a second reward signal to update training of the repair agent during the deployment;
- sensing radiation at the platform;
- detecting the degradation of the primary NN's ability to perform the primary task comprises sensing radiation at the platform;
- the damage comprises a type selected from a list consisting of: radiation damage, malicious logic (a virus), and cyber-attack;
- outputting results of performing the primary task by the repaired primary NN;
- the plurality of sensors comprises at least two sensors selected from a list consisting of: a radiation sensor, an optical sensor, an audio sensor, an inertial sensor, and a vibration sensor; and
- the platform comprises a deployment location selected from a list consisting of: an aircraft, an earth-orbiting satellite, a deep space probe, a solar probe, a planetary probe, and a ground-based environment with expected radiation exposure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of mitigating effects of damage to neural networks (NNs) onboard a platform, the method comprising:

using a primary NN that is deployed onboard the platform and is trained to perform a primary task onboard the platform and a repair agent trained to repair the primary NN, wherein the repair agent performs the steps of:

detecting, during deployment of the primary NN onboard the platform in an operating environment that is subject to radiation exposure, a degradation of an ability of the primary NN to perform the primary task;

updating a training of the repair agent during deployment of the primary NN based on sensor data from a plurality of sensors onboard the platform, wherein the plurality of sensors comprise at least two of a radiation sensor, an optical sensor, an audio sensor, an inertial sensor, or a vibration sensor; and performing a repair action, based on updating the training, to repair the primary NN, wherein performing the repair action comprises at least one of:

adjusting a node weight within the primary NN,
removing a node within the primary NN,
adjusting a connection within the primary NN,
adding a connection within the primary NN, or
removing a connection within the primary NN; and performing the primary task by the repaired primary NN.

2. The method of claim 1, wherein the degradation of the ability of the primary NN to perform the primary task is caused at least by radiation damage.

3. The method of claim 1, wherein the primary NN comprises a convolutional NN (CNN) and the primary task comprises image classification or object detection.

4. The method of claim 1, wherein the repair agent comprises a reinforcement learning agent.

5. The method of claim 4, wherein the method further comprises training the repair agent, and wherein training the repair agent comprises:

subjecting an NN to radiation;

selecting a candidate repair action; and based on at least the candidate repair action, receiving a reward signal.

6. The method of claim 1, wherein detecting the degradation of the ability of the primary NN to perform the primary task comprises testing the primary NN using a set of test cases, and wherein the method further comprises:

during the deployment, testing the primary NN after performing the repair action, to determine an effectiveness of the repair action; and based on at least the effectiveness of the repair action, generating a first reward signal to update the training of the repair agent during the deployment.

7. The method of claim 1, wherein the method further comprises:

during the deployment, fusing the sensor data from the plurality of sensors to estimate an effectiveness of the repair action; and based on at least the effectiveness of the repair action, generating a second reward signal to update the training of the repair agent during the deployment.

8. A system for mitigating effects of damage to neural networks (NNs) onboard a platform, the system comprising:

one or more processors; and a memory storing instructions that, when executed by the one or more processors, cause the one or more processors to perform operations comprising:

using a primary NN that is deployed onboard the platform and is trained to perform a primary task onboard the platform and a repair agent that is trained to repair the primary NN, wherein the repair agent performs the steps of:

detecting, during deployment of the primary NN onboard the platform in an operating environment that is subject to radiation exposure, a degradation of an ability of the primary NN to perform the primary task;

updating a training of the repair agent during deployment of the primary NN based on sensor data from a plurality of sensors onboard the platform, wherein the plurality of sensors comprise at least two of a radiation sensor, an optical sensor, an audio sensor, an inertial sensor, or a vibration sensor; and performing a repair action, based on updating the training, to repair the primary NN, wherein performing the repair action comprises at least one of:

adjusting a node weight within the primary NN, removing a node within the primary NN, adjusting a connection within the primary NN, adding a connection within the primary NN, or removing a connection within the primary NN; and performing the primary task by the repaired primary NN.

9. The system of claim 8, wherein the degradation of the ability of the primary NN to perform the primary task is caused at least by radiation damage.

10. The system of claim 8, wherein the primary NN comprises a convolutional NN (CNN) and the primary task comprises image classification or object detection.

11. The system of claim 8, wherein the repair agent comprises a reinforcement learning agent.

12. The system of claim 11, wherein the operations further comprise training the repair agent, and wherein training the repair agent comprises:

subjecting an NN to radiation;

selecting a candidate repair action; and based on at least the candidate repair action, receiving a reward signal.

13. The system of claim 8, wherein detecting the degradation of the ability of the primary NN to perform the primary task comprises testing the primary NN using a set of test cases, and wherein the operations further comprise:

during the deployment, testing the primary NN after performing the repair action, to determine an effectiveness of the repair action; and based on at least the effectiveness of the repair action, generating a first reward signal to update the training of the repair agent during the deployment.

14. The system of claim 8, wherein the operations further comprise:

during the deployment, fusing the sensor data from the plurality of sensors to estimate an effectiveness of the repair action; and based on at least the effectiveness of the repair action, generating a second reward signal to update the training of the repair agent during the deployment.

15. A computer program product, comprising a non-transitory computer usable medium having a computer readable program code embodied therein, the computer readable program code adapted to be executed to implement a method of mitigating effects of damage to neural networks (NNs) onboard a platform, the method comprising:

using a primary NN that is deployed onboard the platform and is trained to perform a primary task onboard the platform and a repair agent trained to repair the primary NN, wherein the repair agent performs the steps of:

detecting, during deployment of the primary NN onboard the platform in an operating environment that is subject to radiation exposure, a degradation of an ability of the primary NN to perform the primary task;

updating a training of the repair agent during deployment of the primary NN based on sensor data from a plurality of sensors onboard the platform, wherein the plurality of sensors comprise at least two of a radiation sensor, an optical sensor, an audio sensor, an inertial sensor, or a vibration sensor; and performing a repair action, based on updating the training, to repair the primary NN, wherein performing the repair action comprises at least one of:

adjusting a node weight within the primary NN, removing a node within the primary NN, adjusting a connection within the primary NN, adding a connection within the primary NN, or removing a connection within the primary NN; and performing the primary task by the repaired primary NN.

16. The computer program product of claim 1, wherein the degradation of the ability of the primary NN to perform the primary task is caused at least by radiation damage.

17. The computer program product of claim 1, wherein the primary NN comprises a convolutional NN (CNN) and the primary task comprises image classification or object detection.

18. The computer program product of claim 1, wherein the repair agent comprises a reinforcement learning agent.

19. The computer program product of claim 18, wherein the method further comprises training the repair agent, and wherein training the repair agent comprises:

subjecting an NN to radiation;

selecting a candidate repair action; and based on at least the candidate repair action, receiving a reward signal.

20. The computer program product of claim 1, wherein detecting the degradation of the ability of the primary NN to perform the primary task comprises testing the primary NN using a set of test cases, and wherein the method further comprises:

during the deployment, testing the primary NN after performing the repair action, to determine an effectiveness of the repair action; and based on at least the effectiveness of the repair action, generating a first reward signal to update the training of the repair agent during the deployment.

* * * * *